Patented Oct. 21, 1947

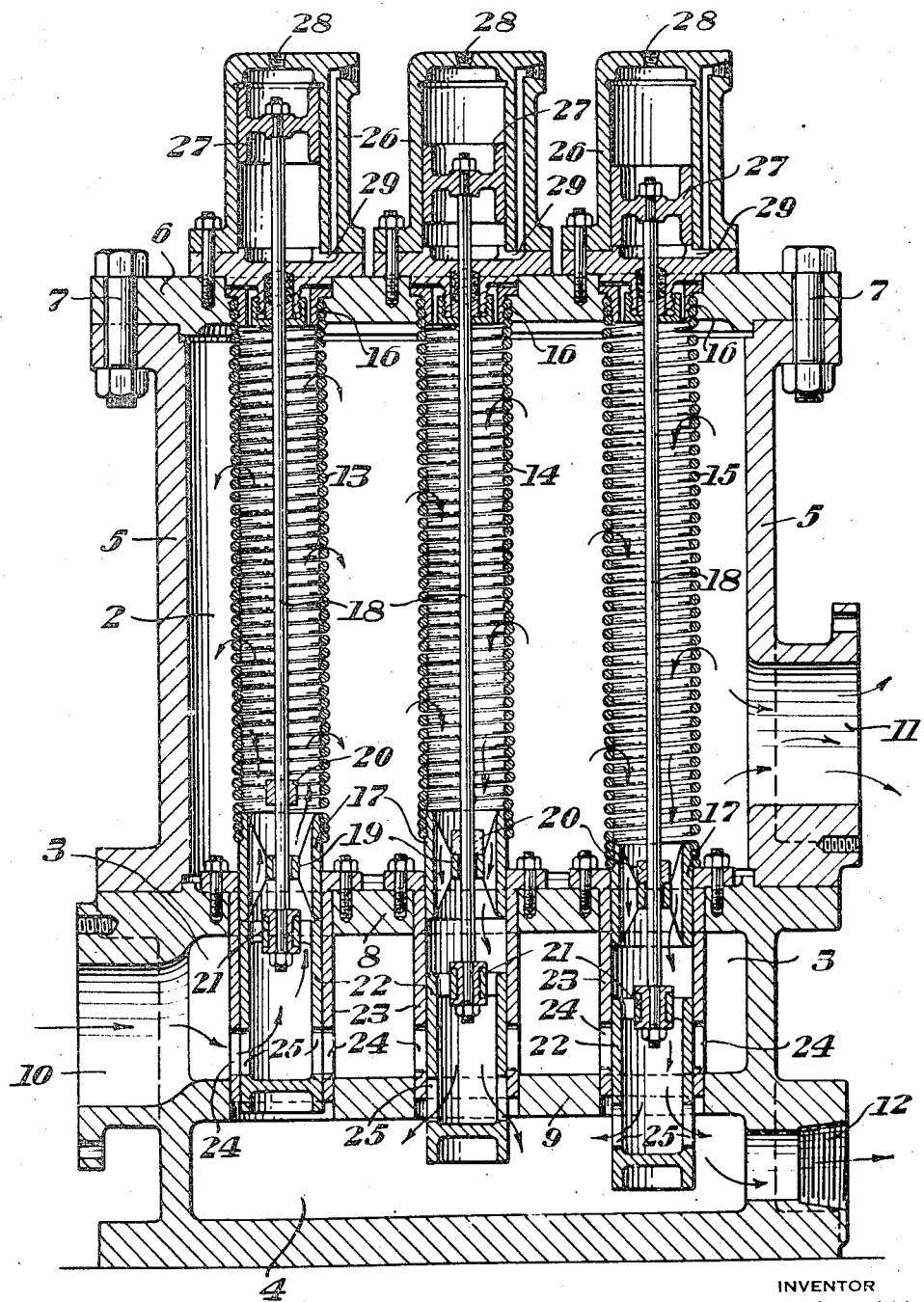

2,429,417

UNITED STATES PATENT OFFICE 2,429,417

AUTOMATIC SELF-CLEANING WATER STRAINER

Franklin R. Magill, Mount Lebanon, Pa.

Application January 16, 1945, Serial No. 572,991

7 Claims. (Cl. 210—167)

This invention relates to an automatic self-cleaning water strainer. The invention briefly described comprises an inlet chamber, a straining chamber and a backwash chamber. A plurality of coil spring strainer units are located in the straining chamber. Valves are arranged in the inlet chamber and means are provided for operating the valves at intervals. When a valve is in one position, the dirty water to be strained flows through the inlet chamber into the interior of the associated coil spring strainer unit depositing dirt on the interior of the strainer unit. During this straining interval, the coils of the strainer unit are non-expanded. By "non-expanded" I mean that the spaces between the coils of the strainer unit are such as to prevent solid particles of undesirably large size passing through these spaces. In order to backwash a strainer unit, a valve associated with that unit is moved to a position which establishes communication between the interior of the strainer unit and the backwash chamber. When the valve has established communication between the interior of the strainer unit and the backwash chamber, the coil spring strainer unit is expanded thereby separating the coils of the spring so that in backwashing, the strained water flows from the outside of the strainer unit to the interior of the strainer unit and then to the backwash chamber. The flow of water through the strainer unit during backwashing is in the opposite direction to its flow during straining so that dirt particles which have been deposited on the inside of the coil during straining are carried into the backwash chamber and out of the strainer body during backwashing without opportunity for the dirt particles to contaminate the water in the strained water chamber.

In the accompanying drawing which illustrates a preferred embodiment of the invention, the single figure is a vertical section through a strainer, certain parts being shown in a somewhat diagrammatic manner.

Referring more particularly to the figure, the strainer comprises a straining chamber 2, an inlet chamber 3 and a backwash chamber 4. These and other parts of the strainer may be made of cast iron, cast steel, rolled steel or other suitable material. The straining chamber 2 is formed by a cylindrical body portion 5 forming the sides of the chamber, a top 6 secured to the sides 5 by bolts and nuts 7, and a bottom portion 8. The bottom 8 of the straining chamber also forms the top of the inlet chamber 3. The backwash chamber 4 is separated from the inlet chamber by a wall 9.

The inlet chamber has an inlet 10 for dirty water to be strained, the straining chamber 2 has an outlet 11 for strained water and the backwash chamber 4 has an outlet 12 for backwash water carrying dirt which has been removed from the interior of the coil spring strainer units.

Coil spring strainer units 13, 14 and 15 are located in the straining chamber 2. In the drawing three such coil spring strainer units are shown, but it will be understood that the number of units may be varied according to the capacity desired for the strainer. In no case will there be less than two strainer units thereby allowing one strainer unit to be backwashed while the other unit is straining water, but in most cases the strainer comprises 7 or 8 or more strainer units. While some of the units are straining water, others are being backwashed thereby providing a continuous supply of strained water. Each coil spring strainer unit may be constituted by a single coil spring as shown in the drawing or by a plurality of coil springs.

The construction of each strainer unit and the associated valve and mechanism for operating the valves is the same for each unit. Each of the coil spring strainer units 13, 14 and 15 comprises a coil of wire, the cross section of which may be round, square, triangular or of other shape. It may be smooth or may be made with small indentations or projections so that the water may pass between the coils or through the spaces provided by the indentations or projections while retaining the solid particles. Each of the coil springs is secured at its top to the top 6 of the strainer as indicated by the reference numeral 16. The bottom of each coil spring is secured to a sleeve 17 by welding or other suitable means. The sleeve 17 is slidably mounted on a piston rod 18 by means of a spider 19 whereby the piston rod may slide through the sleeve within the limit allowed by a stop 20 secured to the piston rod. The lower end of each piston rod 18 is secured to the spider 21 of a sleeve valve 22 operating within a cylinder 23. The cylinder 23 has ports 24 and the sleeve valve 22 has ports 25.

Each of the piston rods 18 extends upwardly into a cylinder 26 and is connected to a piston 27 operating within the cylinder. Each of the cylinders 26 has an upper port 28 and a lower port 29 for fluid used in operating the piston 27.

When the strainer is in operation, the pistons 27 are operated from time to time so as to move the valves and expand the coils of the coil spring strainer units 13, 14 and 15. The drawing shows three positions of the valves and strainer units.

With the parts in the positions shown for the strainer unit 13, the dirty water to be strained enters through the inlet 10, passes through the ports 24 and 25 and upwardly into the interior of the coil spring 13. The water flows between the coils of the coil spring into the straining chamber 2, thereby depositing dirt particles on the interior of the coil spring. After an interval of straining water, the piston 27 is moved downwardly to the intermediate position as shown for the middle strainer unit 14. In this position the piston rod 18 has moved down to a position at which the stop 20 has just contacted the spider 19 of sleeve 17. The sleeve valve 22 has been lowered to a position so that it closes the ports 24 so that water cannot flow from the inlet chamber into the interior of the coil spring 14. The port 25 of the sleeve valve has been lowered so as to establish communication between the interior of the coil spring 14 and the backwash chamber 4. In this position, however, the coil spring 14 has not been expanded.

As the piston 27 moves to the position shown for the righthand strainer unit 15, the sleeve valve 22 moves to a still lower position while keeping the ports 24 closed and maintaining communication between the interior of the coil spring 15 and the backwash chamber 4 through the ports 25. The downward movement of the stop 20 causes the sleeve 17 to move downwardly thereby expanding the coil spring 15 so as to separate the coils and allow backwashing of the unit 15. In backwashing the water flows from the outside of the coil spring 15 into the interior of the coil thereby dislodging dirt particles previously deposited on the interior of the coil and carrying the dirt particles downwardly through the sleeve valve and ports 25 into the backwash chamber from which they flow through the outlet 12.

It will be seen from the above description that during straining, the coils of a strainer unit lie close to each other, but that during backwashing the coils are separated by expanding the spring in order to allow removal of the previously deposited dirt particles on the interior of the units. In backwashing the flow of water is in the opposite direction to that during straining so that at all times during the operation of the strainer the dirt particles are prevented from entering the straining chamber. As shown in connection with the middle strainer unit 14, the sleeve valve 22 has closed the ports 24 into the inlet chamber and has established communication between the interior of the coil spring 14 and the backwash chamber 4 because of the position of ports 25 before the coil spring 14 has been expanded. Accordingly, any dirt particles removed from the interior of the coils 14 or 15 during backwashing must flow into the backwash chamber without having any opportunity to flow into the straining chamber.

In the illustrated embodiment and description, the movement of the valves and the expansion of the springs which opens up the spaces between the coils of the coil spring strainer units is shown as being operated hydraulically. However, these same movements can be accomplished mechanically, pneumatically or electrically. While I have illustrated and described valves of the sleeve type, rotary or other type valves may be employed.

The invention is not limited to the preferred embodiment which has been described merely for purposes of illustration, but may be otherwise embodied or practiced within the scope of the following claims.

I claim:

1. A water strainer comprising an inlet chamber, a straining chamber, a backwash chamber, the inlet chamber being located between the straining chamber and backwash chamber, a plurality of coil spring strainer units in the straining chamber, conduits in the inlet chamber, each conduit providing a passage between the straining chamber and inlet chamber through one of said strainer units and a passage between the straining chamber and backwash chamber through one of said strainer units, a valve in each conduit and means for operating said valve, said valve when in one position opening said first mentioned passage and closing said second mentioned passage and when in another position closing said first mentioned passage and opening said second mentioned passage, the interior of each strainer unit communicating with one of said conduits, and mechanism for expanding the coil springs, said means for operating said valves and said mechanism for expanding the coil springs being coordinated so as to open said second mentioned passage and close said first mentioned passage when the coil springs are expanded.

2. A water strainer comprising an inlet chamber, a straining chamber located above the inlet chamber, a backwash chamber located below the inlet chamber, a plurality of coil spring strainer units in the straining chamber, conduits in the inlet chamber, each conduit providing a passage between the straining chamber and inlet chamber through one of said strainer units and a passage between the straining chamber and backwash chamber through one of said strainer units, a valve in each conduit and means for operating said valve, said valve when in one position opening said first mentioned passage and closing said second mentioned passage and when in another position closing said first mentioned passage and opening said second mentioned passage, the interior of each strainer unit communicating with one of said conduits, and mechanism for expanding the coil springs, said means for operating said valves and said mechanism for expanding the coil springs being coordinated so as to open said second mentioned passage and close said first mentioned passage when the coil springs are expanded.

3. A water strainer comprising an inlet chamber, a straining chamber located above the inlet chamber, a backwash chamber located below the inlet chamber, a plurality of coil spring strainer units in the straining chamber, conduits in the inlet chamber, each conduit providing a passage between the straining chamber and inlet chamber through one of said strainer units and a passage between the straining chamber and backwash chamber through one of said strainer units, a slide valve in each conduit and means for operating said slide valve, said slide valve when in one position opening said first mentioned passage and closing said second mentioned passage and when in another position closing said first mentioned passage and opening said second mentioned passage, the interior of each strainer unit communicating with one of said conduits, and mechanism for expanding the coil springs, said means for operating said slide valves and said mechanism for expanding the coil springs being coordinated so as to open said second mentioned passage and close said first mentioned passage when the coil springs are expanded.

4. A water strainer comprising an inlet chamber, a straining chamber located above the inlet chamber, a backwash chamber located below the inlet chamber, a plurality of coil spring strainer units in the straining chamber, conduits in the inlet chamber, each conduit providing a passage between the straining chamber and inlet chamber through one of said strainer units and a passage between the straining chamber and backwash chamber through one of said strainer units, a slide valve in each conduit, a rod for operating said slide valve and means for reciprocating said rod, said slide valve when in one position opening said first mentioned passage and closing said second mentioned passage and when in another position closing said first mentioned passage and opening said second mentioned passage, the interior of each strainer unit communicating with one of said conduits, a sleeve connected to the lower end of the coil spring and slidable in said conduit and slidable on said rod, said sleeve being operable by a lost motion connection with said rod to expand said coil spring when said valve is in position which opens said second mentioned passage and closes said first mentioned passage.

5. A water strainer comprising an inlet chamber, a straining chamber located above the inlet chamber, a backwash chamber located below the inlet chamber, a plurality of coil spring strainer units in the straining chamber, conduits in the inlet chamber, each conduit providing a passage between the straining chamber and inlet chamber through one of said strainer units and a passage between the straining chamber and backwash chamber through one of said strainer units, a slide valve in each conduit, a rod for operating said slide valve and means for reciprocating said rod, said slide valve when in one position opening said first mentioned passage and closing said second mentioned passage and when in another position closing said first mentioned passage and opening said second mentioned passage, the interior of each strainer unit communicating with one of said conduits, a sleeve connected to the lower end of the coil spring and slidable in said conduit and slidable on said rod, a stop on said rod above said sleeve and adapted to contact said sleeve and move it downwardly so as to expand said coil spring when said valve is in position which opens said second mentioned passage and closes said first mentioned passage.

6. A water strainer comprising an inlet chamber, a straining chamber located above the inlet chamber, a backwash chamber located below the inlet chamber and having an inlet port, a plurality of coil spring strainer units in the straining chamber, a plurality of conduits in the inlet chamber, there being one conduit for each strainer unit, each conduit connecting the straining chamber with the backwash chamber through one of said strainer units, each conduit having a port intermediate its ends communicating with the inlet chamber, a slide valve in each conduit, each slide valve being closed at its bottom and having a port intermediate its ends, said slide valve being movable to one position in which its port registers with the port in the conduit and its bottom closes the backwash chamber inlet port and also being movable to another position in which its port communicates with the backwash chamber inlet port and said conduit port is closed by said slide valve, a rod for operating said slide valve and means for reciprocating said rod, a sleeve connected to the lower end of the coil spring and slidable in said conduit and slidable on said rod, said sleeve being operable by a lost motion connection with said rod to expand said coil spring when the slide valve is in said other position.

7. A water strainer comprising an inlet chamber, a straining chamber located above the inlet chamber, a backwash chamber located below the inlet chamber and having an inlet port, a plurality of coil spring strainer units in the straining chamber, a plurality of conduits in the inlet chamber, there being one conduit for each strainer unit, each conduit connecting the straining chamber with the backwash chamber through one of said strainer units, each conduit having a port intermediate its ends communicating with the inlet chamber, a slide valve in each conduit, each slide valve being closed at its bottom and having a port intermediate its ends, said slide valve being movable to one position in which its port registers with the port in the conduit and its bottom closes the backwash chamber inlet port and also being movable to another position in which its port communicates with the backwash chamber inlet port and said conduit port is closed by said slide valve, a rod for operating said slide valve and means for reciprocating said rod, a sleeve connected to the lower end of the coil spring and slidable in said conduit and slidable on said rod, a stop on said rod above said sleeve and adapted to contact said sleeve and move it downwardly so as to expand said coil spring when the slide valve is in said other position.

FRANKLIN R. MAGILL.

REFERENCES CITED

The following references are of record in the file of this patent:

UNITED STATES PATENTS

| Number | Name | Date |
| --- | --- | --- |
| 2,083,183 | Adams | June 8, 1937 |
| 2,338,418 | Forrest et al. | Jan. 4, 1944 |
| 2,197,971 | Elze et al. | Apr. 23, 1940 |
| 2,301,430 | Malanowski | Nov. 10, 1942 |

FOREIGN PATENTS

| Number | Country | Date |
| --- | --- | --- |
| 527,259 | Great Britain | Oct. 4, 1940 |
| 502,103 | Great Britain | Mar. 10, 1939 |